United States Patent
Zhu et al.

(10) Patent No.: US 9,042,893 B2
(45) Date of Patent: May 26, 2015

(54) CONGESTION CONTROL METHOD FOR FEMTOCELL

(71) Applicant: Sernet (Suzhou) Technologies Corporation, Jiangsu (CN)

(72) Inventors: Ling Zhu, Su Zhou (CN); Yuan Zhang, Jiangsu (CN)

(73) Assignee: SERNET (SUZHOU) TECHNOLOGIES CORPORATION, Jiangsu (CN)

( * ) Notice: Subject to any disclaimer, the term of this patent is extended or adjusted under 35 U.S.C. 154(b) by 331 days.

(21) Appl. No.: 13/684,236

(22) Filed: Nov. 22, 2012

(65) Prior Publication Data

US 2013/0130691 A1  May 23, 2013

(30) Foreign Application Priority Data

Nov. 23, 2011  (CN) .......................... 2011 1 0375579

(51) Int. Cl.
| | |
|---|---|
| *H04W 28/02* | (2009.01) |
| *H04W 16/08* | (2009.01) |
| *H04W 48/08* | (2009.01) |
| *H04W 84/04* | (2009.01) |

(52) U.S. Cl.
CPC .......... *H04W 28/0289* (2013.01); *H04W 16/08* (2013.01); *H04W 48/08* (2013.01); *H04W 84/045* (2013.01)

(58) Field of Classification Search
CPC ... H04W 24/02; H04W 84/045; H04W 28/08; H04W 16/08; H04W 36/22; H04W 28/0289; H04W 48/18; H04W 36/14; H04W 36/08; H04W 72/04; H04W 52/343; H04W 52/367; H04W 28/02; H04W 48/06; H04W 72/1252

USPC ............... 455/41.2, 522, 524, 525, 436, 444, 455/452.1, 452.2, 453; 370/252, 318, 328, 370/331, 332, 338

See application file for complete search history.

(56) References Cited

U.S. PATENT DOCUMENTS

| | | | |
|---|---|---|---|
| 7,190,958 B1 * | 3/2007 | Yarkosky | 455/436 |
| 8,200,253 B2 * | 6/2012 | Du | 455/458 |
| 8,498,207 B2 * | 7/2013 | Trigui et al. | 370/235 |
| 8,718,655 B2 * | 5/2014 | Dominguez Romero et al. | 455/445 |
| 8,725,150 B2 * | 5/2014 | Ho | 455/436 |
| 2010/0240376 A1 * | 9/2010 | Dominguez Romero et al. | 455/445 |
| 2011/0244870 A1 * | 10/2011 | Lee | 455/444 |
| 2011/0256880 A1 * | 10/2011 | Golaup et al. | 455/453 |

(Continued)

OTHER PUBLICATIONS

Full English (machine) translation of CN1838817 (Published Sep. 27, 2006).

(Continued)

*Primary Examiner* — Michael Mapa
*Assistant Examiner* — Martin Chang
(74) *Attorney, Agent, or Firm* — McClure, Qualey & Rodack, LLP (57) ABSTRACT

A congestion control method for a femtocell is provided. When the femtocell is not congested, the femtocell is prompted to enter an access permitted mode. When the femtocell enters the access permitted mode, the femtocell sends a system information modification notification. When the femtocell enters the access permitted mode, the femtocell repeatedly adjusts at least one cell selection parameter or at least one cell reselection parameter to gradually increase a coverage of the femtocell.

12 Claims, 5 Drawing Sheets

(56) References Cited

U.S. PATENT DOCUMENTS

2012/0282979 A1* 11/2012 Ashraf et al. .................. 455/561
2013/0122906 A1* 5/2013 Klatt .......................... 455/435.1
2013/0130688 A1* 5/2013 Chin et al. ................... 455/436

OTHER PUBLICATIONS

Full English (machine) translation of CN102026222 (Published Apr. 20, 2011).

* cited by examiner

CONGESTION CONTROL METHOD FOR FEMTOCELL

This application claims the benefit of People's Republic of China application Serial No. 201110375579.6, filed Nov. 23, 2011, the subject matter of which is incorporated herein by reference.

BACKGROUND

1. Technical Field

The disclosure relates in general to a congestion control method, and more particularly to a congestion control method for a femtocell.

2. Background

In a mobile communication system such as a 3G network, a femtocell (or a cell) connects to a mobile user equipment (UE) in a household or a small area via an air interface, and connects/directs the user equipment to a network of a service provider via a broadband network to achieve mobile data flow division. Thus, indoor communication quality may be improved while also providing audio and data services at low costs.

The femtocell may be categorized into a home node-B (HNB) and a home-evolved node-B (HeNB). In the femtocell technique, small areas (or referred to as beehive cells) having wireless coverage are allotted in a regional areas such as a household, business unit, or a similar small-sized area, to provide wireless coverage and access services for a user equipment.

When requirements for network resources exceed capabilities of access equipments, network performance becomes degraded to result in congestion. The congestion may generally be solved by increasing the number of femtocells deployed, and yet another issue of increased costs is raised. Therefore, maintaining a balanced service amount is crucial for keeping congestion under control. In practice, to maintain a balanced service amount, a congested femtocell is prompted to enter a barred mode, so that a user equipment (UE) will be redirected to other neighboring small areas (or referred to as neighboring cells) to share a part of the service amount to the neighboring cells.

However, the dismissal of the congestion from the congested femtocell may undesirably affect the congested femtocell. For example, in the event that signal quality of the neighboring cells is less than that of the original cell, UE will again request for an access once the congestion is dismissed from the previously congested femtocell. Since usable resources of the previously congested femtocell already approach the brink of saturation, the congested-dismissed femtocell receiving the request for the access shall be further burdened to again incur congestion of the femtocell.

SUMMARY OF THE DISCLOSURE

The disclosure is directed to a congestion control method for processing and restoring a femtocell from congestion and reducing a congestion rate of the femtocell.

According to an example of the present disclosure, a congestion control method for a femtocell is provided. A femtocell enters an access permitted mode when the femtocell is not congested. The femtocell sends a notification of system information modification when the femtocell enters the access permitted mode. When the femtocell enters the access permitted mode, the femtocell repeatedly adjusts at least one cell selection parameter or at least one cell reselection parameter to gradually increase a coverage of the femtocell.

The above and other contents of the disclosure will become better understood with regard to the following detailed description of the preferred but non-limiting embodiments. The following description is made with reference to the accompanying drawings.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION OF THE DISCLOSURE

In a congestion control method for a femtocell and associated computer program product provided by embodiments of the present disclosure, by repeatedly adjusting a cell selection parameter(s) or a cell reselection parameter(s), coverage of a femtocell to be recovered from congestion is gradually increased. The adjustment of the cell selection parameter(s) or the cell reselection parameter(s) increases cell selection standards of a user equipment, so that the femtocell is not easily to be reconnected by the user equipment. Further, by gradually increasing the coverage, user equipments are allowed to in sequence reconnect to the femtocell to prevent the femtocell from congestion caused by excessive user equipments concurrently reconnecting to the femtocell. Accordingly, the femtocell may be effectively recovered from congestion to reduce the congestion rate of the femtocell.

Figure 1:
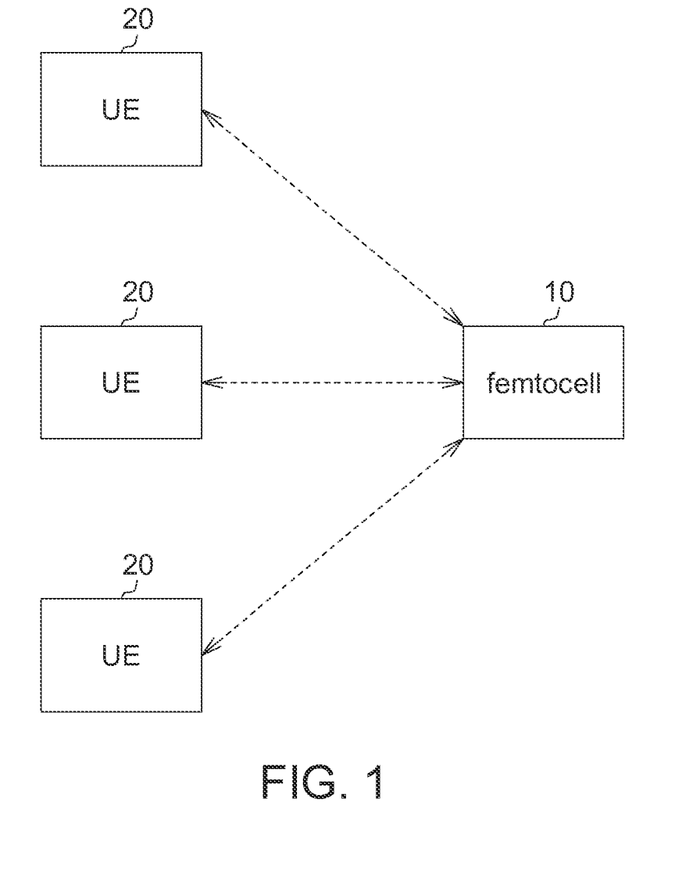
FIG. 1 is a schematic diagram of an exemplary environment of a femtocell.

FIG. 1 shows a schematic diagram of an exemplary environment of a femtocell.

For example, a femtocell 10 is a home node-B (HNB) or a home-evolved node-B (HeNB). The femtocell 10 may be regarded as a cell, e.g., a 360-degree omni directional cell. Alternatively, the femtocell 10 may be divided into several cells, e.g., three cells, each handling a 120-degree range to construct 360-degree omni directional signal coverage.

The femtocell 10 may be deployed in a household, a school, a service unit, or a region of a business to provide wireless coverage, and to provide access services for a user equipment (UE) 20. However, due to limited resources of the femtocell 10, the femtocell 10 encounters a congestion issue resulted by insufficient resources.

In one embodiment of the present disclosure, various congestion control methods may be implemented to the femtocell 10 in FIG. 1. The methods include a congestion determining method, a congestion dismissing method, a congestion processing method and a method for recovering from congestion. The above methods shall be described below with reference to FIG. 1.

A. Determining Femtocell Congestion

The congestion determining method determines whether the femtocell 10 is congested.

In one embodiment, it is determined whether the femtocell 10 is congested based on three criteria.

1) The Number of User Equipments:

A maximum number of user equipment allowable to access the femtocell 10 is limited. When the number of allowable user equipments accessing the femtocell 10 reaches the maximum number, it means the femtocell 10 is congested.

For example, the femtocell 10 is determined as congested when Equation (1) is satisfied:

$$Nwork \leq Nmax \qquad \text{Equation (1)}$$

Where, Nwork represents the number of user equipments currently accessing the femtocell 10, and Nmax represents the maximum number of user equipments allowable to access the femtocell 10.

2) The Transmission Power of the Femtocell:

A maximum transmission power of the femtocell 10 is limited (e.g., 20 dBm). When the femtocell 10 approaches the maximum transmission power, the femtocell 10 cannot allow access of more user equipments. Therefore, an approach for obtaining current transmission power of the femtocell 10 is a key factor for determining whether the femtocell 10 is congested. In one embodiment, the current transmission power of the femtocell 10 may be obtained through measurement such as common measurement and/or dedicated measurement.

In practice, the transmission power of the femtocell 10 however may fluctuate, and so it may not be ensured that the current transmission power does not exceed the maximum transmission power, solely based on measurement. Considering that the femtocell 10 is mainly applied indoors, a power fluctuation range of predetermined services are also fixed. Thus, power fluctuations of the services may be recorded and calculated into experience values as references for estimating the power. By combining the measurement results and power experiment values of the services, the current transmission power of the femtocell 10 may be accurately obtained.

For example, the femtocell 10 is determined as being congested when Equation (2) is satisfied:

$$Pcur \geq Pmax - \Delta P \qquad \text{Equation (2)}$$

Where, Pcur represents the current transmission power of the femtocell 10; and Pmax represents the maximum transmission power of the femtocell 10. $\Delta P$ is a reserved value representing basic power and a possible fluctuation range for allowing access of a user equipment, and may be obtained through experience values, trial-and-error experiments or optimization.

Further, to prevent contingent excessive transmission power, the femtocell 10 may include a timer, which is activated when Equation (2) is satisfied. When the timer is timeout and Equation (2) is satisfied, the femtocell 10 is determined as being congested.

3) Code Resources:

Code resources of the femtocell 10 are limited. In a code division communication system, a scrambler code is for distinguishing different user equipments in an uplink (from a user equipment to the femtocell 10). In a downlink, a main scrambler code is for distinguishing different cells, a channelized code is for distinguishing channels, and code resource management of the cells is mainly management on the downlink channelization codes. Therefore, when no sufficient code resources are available, e.g., no sufficient scrambler codes or channelization codes are available, the femtocell 10 is determined as being congested.

In one embodiment, when one or more of the above conditions are satisfied, the femtocell 10 is determined as being congested.

Figure 2:
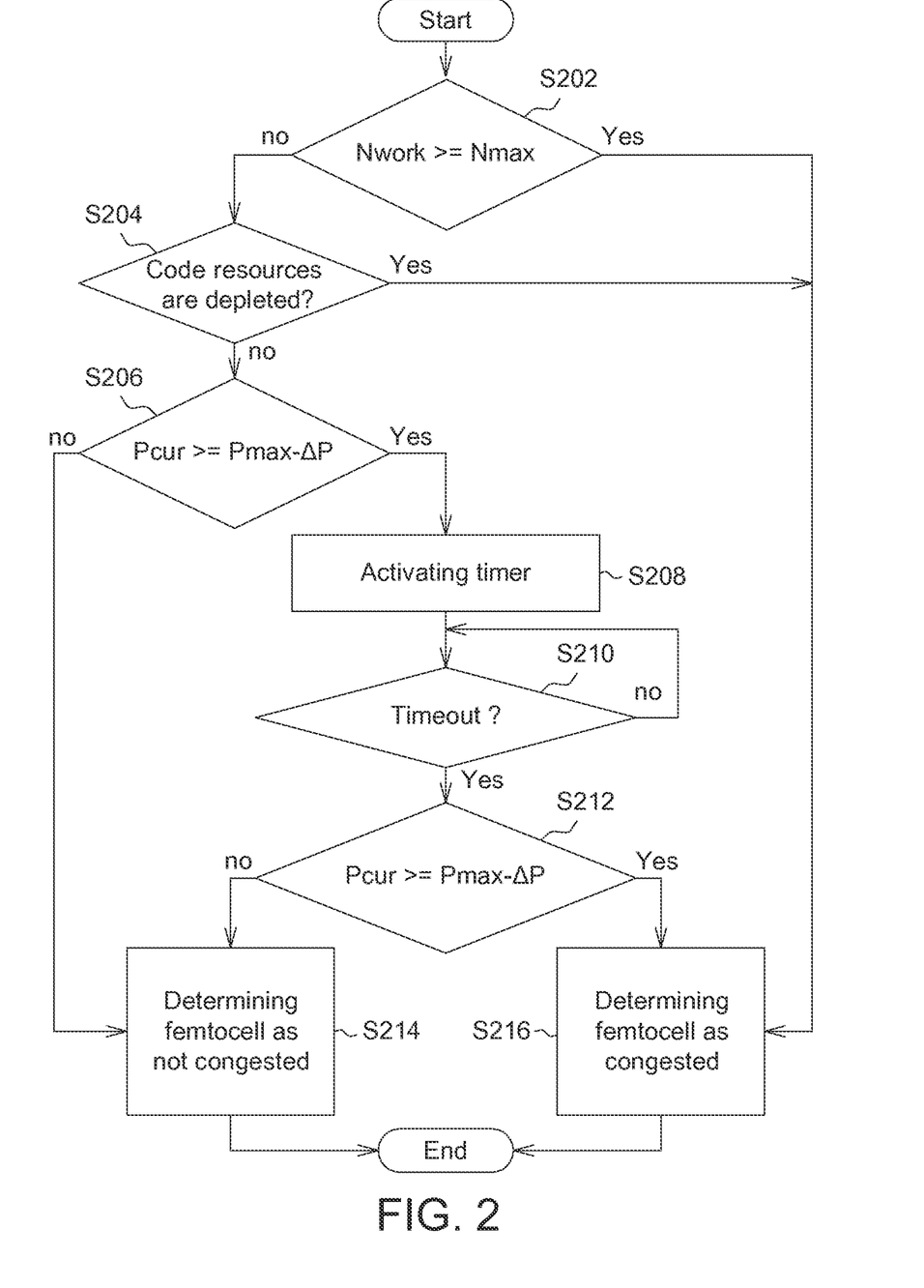
FIG. 2 is a flowchart of a congestion determining method for a femtocell according to one embodiment of the present disclosure.

FIG. 2 shows a flowchart of a congestion determining method according to one embodiment of the present disclosure.

In Step S202, the femtocell 10 determines whether Nwork is greater than Nmax. When a determination result of Step S202 is affirmative, Step S216 is performed to determine the femtocell 10 as being congested. When the determination result of Step S202 is negative, Step S204 is performed.

In Step S204, the femtocell 10 determines whether the code resources are depleted. When the code resources are depleted, Step S216 is performed to determine the femtocell 10 as being congested. When the code resources are not depleted, Step S206 is performed.

In Step S206, the femtocell 10 determines whether Pcur is greater than or equal to (Pmax−$\Delta$P). Step S208 is performed when a determination result of Step S206 is affirmative, or else Step S214 is performed when the determination result of Step S206 is negative. In Step S214, the femtocell 10 is determined as being not congested.

In Step S208, the femtocell 10 activates the timer. In Step S210, the femtocell 10 determines whether the timer is timeout. When the timer is timeout, Step S212 is performed in which the femtocell 10 again determines whether Pcur is greater than or equal to Pmax−$\Delta$P. Step S216 is performed when a determination result of Step S212 is affirmative, or else Step S214 is performed when the determination result of Step S212 is negative.

Of course, the steps S202, S204 and S206 may be performed in other sequence than the flowchart in FIG. 2, which is still with the spirit and scope of the disclosure.

B. Dismissing Femtocell Congestion

The congestion dismissing method determines whether the congestion of a congested femtocell 10 is dismissed.

In one embodiment, for example, conditions for dismissing the congestion of the femtocell 10 is concurrently satisfying the conditions below:

$$1) Nwork < Nmax \qquad \text{Equation (3)}$$

$$2) Pcur < Pmax - \Delta P \qquad \text{Equation (4)}$$

3) Code resources of the femtocell are sufficient for allowing signaling access of one user equipment.

To prevent contingent reduced transmission power, the femtocell 10 includes a timer, which is activated when Equation (4) is satisfied. When the timer is timeout and Equation (4) is satisfied, the femtocell 10 is determined as fulfilling the congestion dismissal condition.

Figure 3:
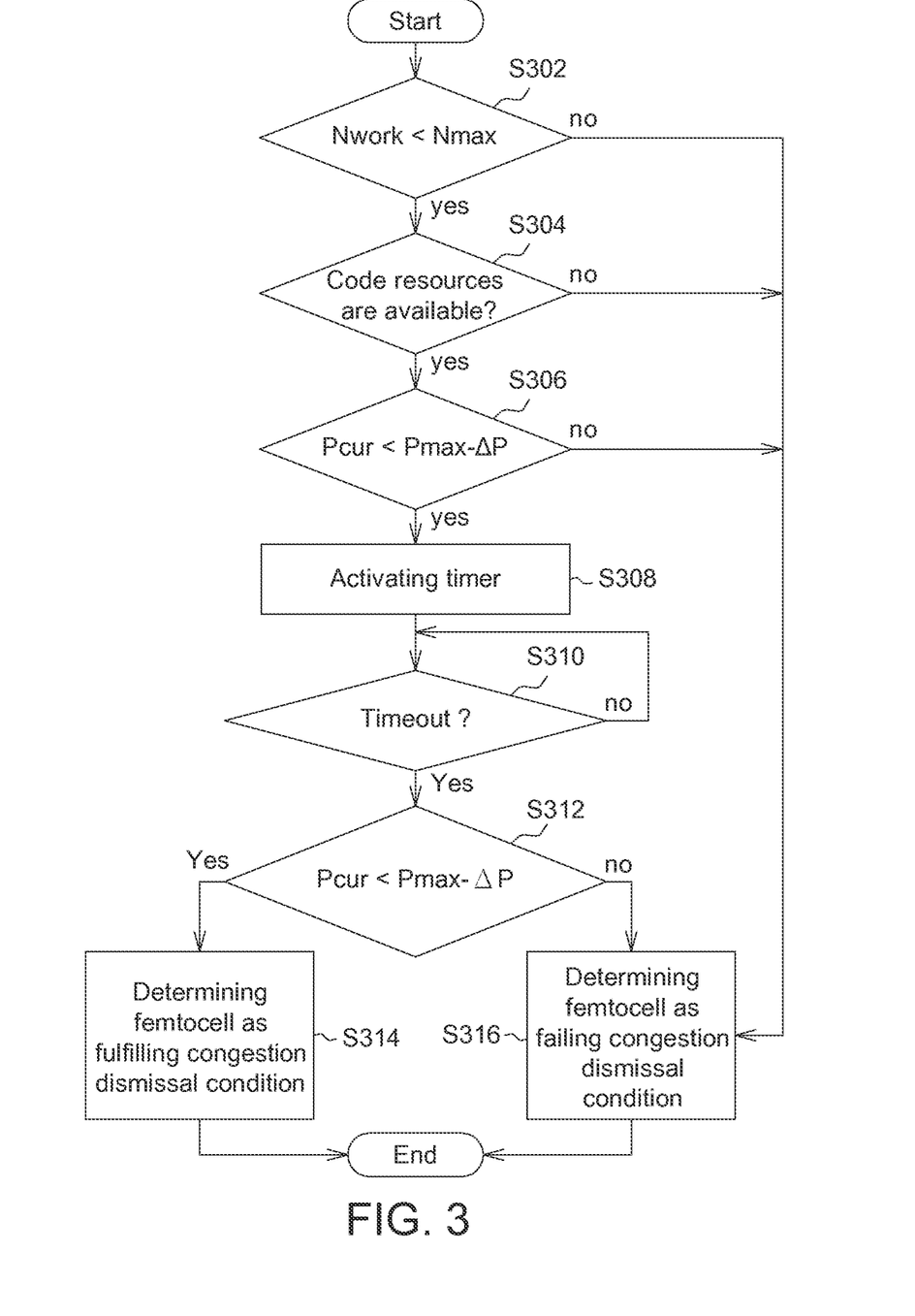
FIG. 3 is a flowchart of a congestion dismissing method for a femtocell according to one embodiment of the present disclosure.

FIG. 3 shows a flowchart of a congestion dismissing method for a femtocell according to one embodiment of the present disclosure.

In Step S302, the femtocell 10 determines whether Nwork is smaller than Nmax. When a determination result of Step S302 is affirmative, Step S304 is performed. When the determination result of Step S302 is negative, Step S316 is performed in which the femtocell 10 is determined as not fulfilling the congestion dismissal condition.

In Step S304, the femtocell 10 determines whether code resources are available. Step S306 is performed when a determination result of Step S304 is affirmative, or else Step S316 is performed when the determination result of Step S304 is negative.

In Step S306, the femtocell 10 determines whether Pcur is smaller than Pmax−ΔP. Step S308 is performed when a determination result of Step S306 is affirmative, or else Step S316 is performed when the determination result of Step S306 is negative.

In Step S308, the femtocell 10 activates the timer. In Step S310, the femtocell 10 determines whether the timer is timeout. When the timer is timeout, Step S312 is performed, in which the femtocell 10 again determines whether Pcur is smaller than Pmax−ΔP. When a determination result of Step S312 is affirmative, the femtocell 10 is determined that the congestion dismissal condition is fulfilled in S314. When the determination result of Step S312 is negative, Step S316 is performed.

C. Processing Femtocell Congestion

The congestion processing method ensures service stability and alleviates congestion for a congested femtocell 10.

When the femtocell 10 is congested, the femtocell 10 is prompted to enter a barred mode. For example, through a system information modification procedure, an access barred sign, e.g., a barred sign, is added into a cellBarred IE (information element) in a system information block type 3 (SIB 3), to indicate that the femtocell 10 is currently in an access barred mode. At this point, according to 3GPP specifications, the femtocell 10 needs to send a system information modification notification to inform the user equipment to re-read the system information.

In one embodiment, the femtocell 10 selectively sends the system information modification notification to at least one user equipment. In other words, for user equipments in different statuses, the femtocell 10 may selectively inform the user equipments with reference to the statuses of the user equipments.

For example, when a user equipment 20 accessing the femtocell 10 is in a working status, the femtocell 10 refuses to send the system information modification notification to the user equipment 20. For example, the working status represents that a service is being processed between the user equipment 20 and the femtocell 10. Thus, for the user equipment 20 in the working status, the user equipment 20 does not re-read the system information, and is prevented from being disconnected due to receiving the cell access barred sign, thereby ensuring service stability of the femtocell 10.

For another example, when the user equipment 20 accessing the femtocell 10 is not in the working status, the femtocell 10 sends the system information modification notification to the user equipment 20. Thus, for the user equipment 20 in a non-working status, the user equipment 20 learns the congestion and disconnects from the femtocell 10 to attempt to connect to another neighboring cell, thereby alleviating the congestion of the femtocell 10.

Take a radio resource control (RRC) status for example. Under the RRC status, a user equipment has two basic operating modes—an idle mode and a connected mode. The idle mode includes an IDLE status; the connected mode includes four statuses, e.g., a CELL_PCH status, URA_PCH status, CELL_FACH status and CELL_DCH status.

In short, the IDLE status is a status in which the user equipment accesses the femtocell 10 and monitors paging messages. The CELL_PCH status and the URA_PCH status are, e.g., statuses in which services and data streams are previously present between the user equipment and the femtocell 10 but no services are currently residing at the femtocell 10. The CELL_FACH status and the CELL_DCH status are, e.g., statuses in which services are currently being processed between the user equipment and the femtocell 10. In this example, the CELL_FACH and CELL_DCH statuses may be regarded as working statuses; the IDLE, CELL_PCH and URA_PCH statuses may be regarded as non-working statuses.

In an exemplary embodiment, the femtocell 10 selectively informs user equipment in different statuses, with details to be described below.

1) UE in IDLE, CELL_PCH and URA_PCH Statuses:

For a user equipment in the IDLE, CELL_PCH or URA_PCH status, no service is being processed between the user equipment and the femtocell 10. In other words, the user equipment does not occupy physical resources of the femtocell 10. However, it is possible that the user equipment may be connected again or switch to other statuses in which services are currently being processed, e.g., the CELL_DCH status, to affect the already-congested or soon-to-be-congested femtocell 10. Thus, the femtocell 10 informs the user equipment in IDLE, CELL_PCH and URA_PCH statuses that the femtocell 10 is currently congested, so that the user equipment may reselect and connect to another cell. For example, the femtocell 10 may use a paging type 1 message containing IE "BCCH modification info" to inform the user equipment via a broadcast control channel (BCCH), thereby alleviating the congestion of the femtocell 10.

2) UE in CELL_FACH Status:

For a user equipment in the CELL_FACH status, it is possible that the user equipment is switched from the CELL_DCH status or the CELL_FACH status by the femtocell 10 according to congestion control strategies, or the user equipment is kept in the CELL_FACH by the femtocell 10 that is soon to be congested. The femtocell 10 may refuse to inform the user equipment in the CELL_FACH status about the occurrence of the congestion. If the user equipment in the CELL_FACH status is informed about the occurrence of the congestion, the user equipment may disconnect from the femtocell 10 and reselect another cell, or may initiate a switch request that further degrades the service stability.

3) UE in CELL_DCH Status:

The femtocell 10 may refuse to inform a user equipment in the CELL_DCH status about the occurrence of the congestion, so that the user equipment maintains its status.

Further, when the congestion is dismissed from the femtocell 10, the femtocell 10 may be prompted to enter an access permitted mode. For example, through a system information modification procedure, an access permitted signal sign, e.g., an unbarred sign, is added into a cellBarred IE in the SIB 3, to indicate that the femtocell 10 is currently in an access permitted mode. At this point, according to 3GPP specifications, the femtocell 10 needs to send a system information modification notification to inform the user equipment to re-read the system information.

Similarly, for user equipments in different statuses, the femtocell 10 may selectively inform the user equipments with reference to the statuses of the user equipments. For example, the femtocell 10 may inform a user equipment in the IDLE, CELL_PCH or URA_PCH status. Further, since a user equipment in the CELL_FACH and CELL_DCH statuses is unaware that system information has been modified, the user equipments in the CELL_FACH and CELL_DCH statuses consider the femtocell 10 as in an access permitted mode. Therefore, the femtocell 10 may refuse to inform the user equipments in the CELL_FACH or CELL_DCH status.

Accordingly, when a femtocell is congested, a user equipment in a non-working mode (e.g., IDLE, CELL_PCH and URA_PCH statuses) may reselect another cell, a user equipment in a working mode (e.g., CELL_FACH and CELL_DCH statuses) may normally process services, and a user equipment not resided at the congested femtocell does not attempt to reside at the congested femtocell. Thus, the service stability of the femtocell 10 is optimized to reduce the congestion.

In an alternative embodiment, when the femtocell 10 is in an isolated island environment, the femtocell 10 is prioritized to enter the access permitted mode. A so-called isolated island environment is a situation that no other base stations or cells around the femtocell 10 are available for providing access services. Under such situation, if the femtocell 10 is set as congested, a call from a user equipment requiring an emergency call may be failed. Hence, the approach of prioritizing the femtocell 10 in an isolated island environment to enter the access permitted mode ensures the service stability of the femtocell 10.

D. Processing Femtocell Congestion

The congestion processing method allows a congested femtocell 10 to mask an access attempt of a user equipment. According to 3GPP specifications, when a femtocell 10 remains in the access barred mode for a period, a user equipment considers the femtocell 10 as an unserviceable cell and looks for another neighboring cell. However, in the event that the signal quality of the neighboring cell is less than that of the femtocell 10, the user equipment will again request for access once the congestion of the femtocell 10 is dismissed. At this point, the usable resources of the congested femtocell 10 are already at the brink of saturation, and so such access request desirably imposes additional burden on the femtocell 10. For example, the attempt access of the user equipment occupies common channel information to increase pointless consumption of the femtocell 10. Further, the dismissal of the congestion may quite the contrary lead to another congestion of the femtocell 10.

Therefore, when the congested femtocell 10 enters the access barred mode, at least one cell selection parameter or one cell reselection parameter is adjusted to reduce the coverage of the femtocell 10, so that a possibility that the femtocell 10 is reselected is lowered. Accordingly, an attempt access of a user equipment may be masked to prevent the femtocell from congestion caused by excessive concurrent access attempts of multiple user equipments.

In one embodiment, the cell selection parameter or the cell reselection parameter includes a downlink common channel power parameter, a cell selection minimum quality parameter, a detected cell signal level reception parameter, a hysteresis parameter, and/or a reselection time parameter. It should be noted that, the cell selection parameter or the cell reselection parameter is not limited to the examples above, and may also include other undisclosed parameters associated with the coverage of the femtocell 10.

To reduce the coverage of the femtocell 10, the adjustment for the cell selection parameter or the cell reselection parameter may include the examples of: 1) decreasing a common channel power parameter (e.g., PCPICH transmission power or PCCPCH transmission power); 2) increasing a cell selection minimum quality parameter (q-QualMin), a detected cell received signal level parameter (q-RxlevMin), a first-type hysteresis value (q-Hyst-1-S), a second-type hysteresis value (q-Hyst-2-S), and a reselection timer parameter (t-Reselection-S).

Figure 4:
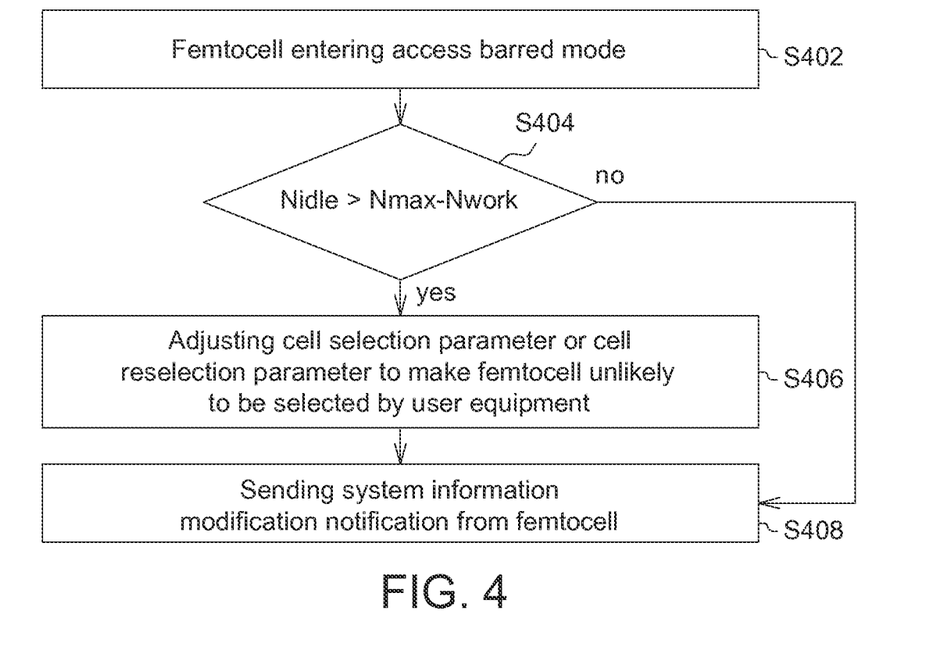
FIG. 4 is a flowchart of a congestion processing method for a femtocell according to one embodiment of the present disclosure.

FIG. 4 shows a flowchart of a congestion processing method for a femtocell according to one embodiment of the present disclosure.

In Step S402, when the femtocell 10 is congested, the femtocell 10 is prompted to enter an access barred mode. For example, through a system information modification procedure, a cellBarred IE is added to an SIB 3 to indicate that the femtocell 10 is in the access barred mode.

In Step S404, the femtocell 10 determines whether the equation below is satisfied:

$$Nidle > Nmax - Nwork \qquad \text{Equation (5)}$$

Where, Nidle represents the number of non-working user equipments, Nwork represents the number of working user equipments, and Nmax represents a maximum number of working user equipments allowed by the femtocell 10.

When the femtocell 10 determines that Nidle is greater than a difference between Nmax and Nwork, Step S406 is performed. When the femtocell 10 determines that Nidle is not greater than the difference between Nmax and Nwork, Step S408 is performed.

In Step S406, the femtocell 10 adjusts each of the cell selection parameters or the cell reselection parameters to a respective predetermined value so that the femtocell 10 is unlikely to be reselected by the user equipment 20.

In Step S408, the femtocell 10 sends a system information modification notification. For example, the femtocell 10 informs the user equipment by a paging type 1 message via BCCH.

E. Recovery from Femtocell Congestion

The method for recovering from femtocell congestion allows the congested femtocell 10 to gradually restore its coverage.

If a user equipment attempts to reselect the femtocell 10 after congestion is dismissed from the femtocell 10, the cell selection parameter of the femtocell 10 makes the femtocell 10 fail to satisfy the selection standards, so as to prevent an excessive number of user equipments from concurrently reconnecting to the femtocell 10.

Figure 5:
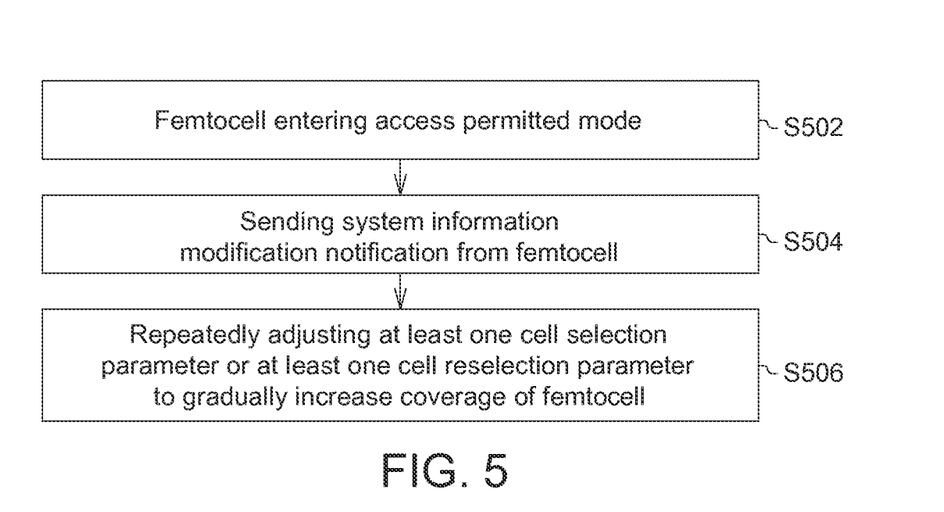
FIG. 5 is a flowchart of a method for recovering from congestion for a femtocell according to one embodiment of the present disclosure.

FIG. 5 shows a flowchart of a method for recovering from congestion for a femtocell according to one embodiment of the present disclosure. In Step S502, when the femtocell 10 is not congested, the femtocell 10 is prompted to enter an access permitted mode. In Step S504, the femtocell 10 sends a system information modification notification when the femtocell 10 enters the access permitted mode. When the femtocell 10 enters the access permitted mode, the femtocell 10 repeatedly adjusts at least one cell selection parameter or at least one cell reselection parameter to gradually increase the coverage of the femtocell 10. Thus, user equipments are allowed to gradually reconnect to the femtocell 10 to prevent the femtocell 10 from congestion again due to excessive concurrent reconnections of multiple user equipments. Accordingly, the femtocell is effectively recovered from the congestion to reduce the congestion rate of the femtocell.

Figure 6:
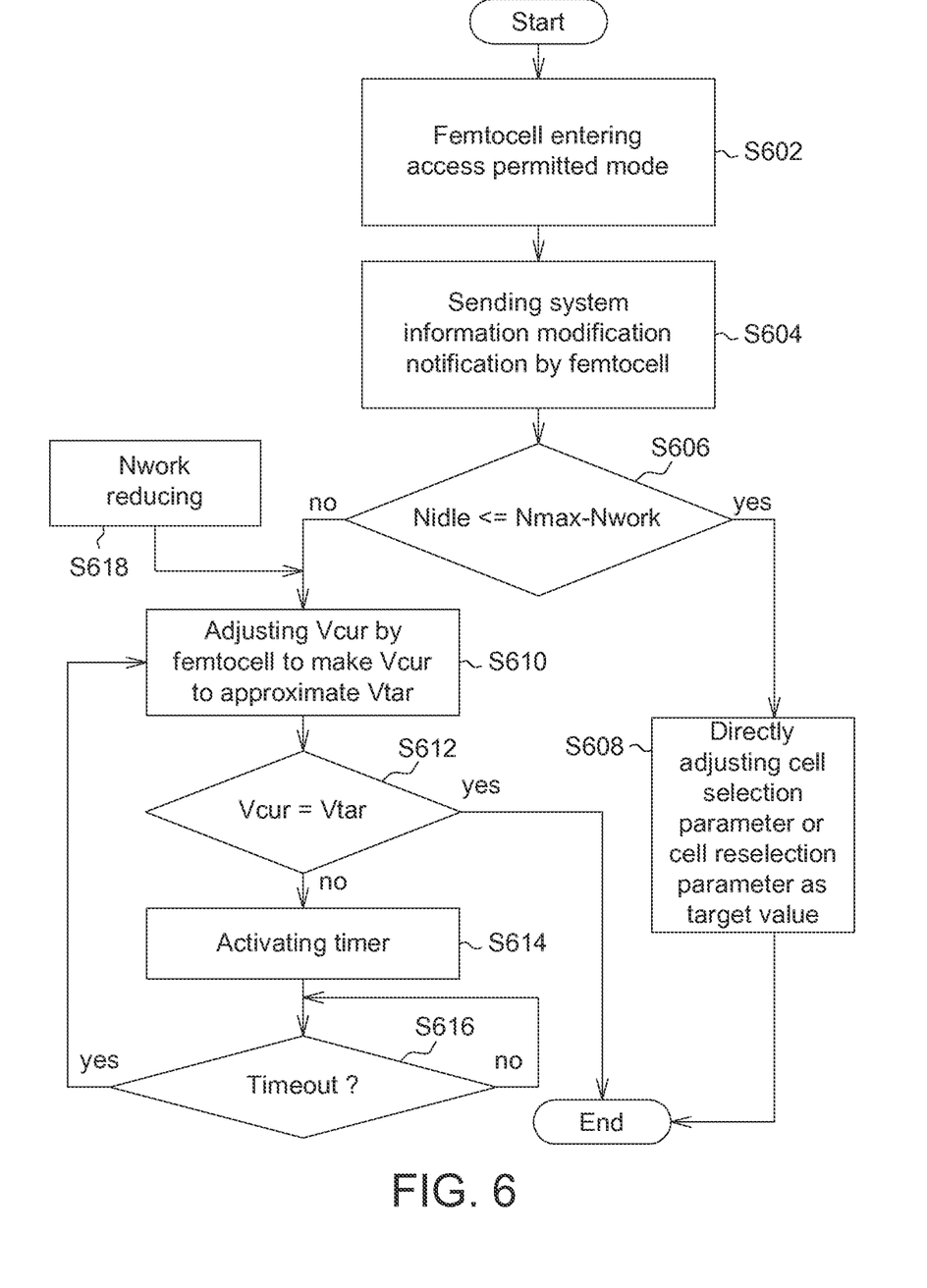
FIG. 6 is an exemplary detailed flowchart of the method in FIG. 5.

FIG. 6 shows a detailed flowchart of the method in FIG. 5. In this embodiment, in order to allow user equipments to gradually and sequentially reconnect to the femtocell 10, the coverage of the femtocell 10 may be gradually adjusted to normal coverage with reference to the values of Nidle and Nwork.

In Step S602, when the femtocell 10 is not congested, the femtocell 10 is prompted to enter an access permitted mode. For example, through a system information modification procedure, a cellBarred IE of the SIB 3 is added to an unbarred sign to indicate the femtocell 10 is currently in an access permitted mode.

In Step S604, the femtocell 10 sends a system information modification notification when the femtocell 10 enters the access permitted mode. For example, the femtocell 10 informs the user equipment by a paging type 1 message via BCCH.

In Step S606, it is determined whether Nidle is greater than a difference between Nmax and Nwork. For example, Nidle is determined according to the difference between Nconnect and Nwork, e.g., Nidle=Nconnect−Nwork, where Nconnect represents the number of user equipments previously connected or currently connected to the femtocell 10 within a predetermined period before the femtocell 10 enters the access barred mode.

In Step S608, when Nidle is not greater than the difference between Nmax and Nwork, the femtocell 10 directly adjusts each cell selection parameter or each cell reselection parameter to a target value. Accordingly, the coverage of the femtocell 10 may be recovered as normal, the same as the femtocell 10 is not congested yet.

In contrast, when Nidle is greater than the difference between Nmax and Nwork, the femtocell 10 iteratively adjusts each cell selection parameter or each cell reselection parameter to a target value. Details of Steps S610 and S616 shall be described below.

In Step S610, the femtocell 10 adjusts one of the cell selection parameters or the cell reselection parameters to approximate the target value. For example, the parameter is adjusted according to the approach below.

$$Vcur'=Vcur-(Vcur-Vtar)*50\%$$

Where Vcur represents a current value of a cell selection parameter or a cell reselection parameter to be adjusted, Vtar represents its target value, and Vcur' represents its adjusted value.

In Step S612, the femtocell 10 determines whether the adjusted cell selection parameter or the adjusted cell reselection parameter reaches the target value. When a determination result of Step S612 is affirmative, the process ends. When the determination result of Step S612 is negative, Step S614 is performed.

In Step S614, the femtocell 10 activates a timer.

In Step S616, the femtocell 10 determines whether the timer is timeout. When a determination result of Step S616 is affirmative, Step S610 is iterated to again adjust the parameter.

In Step S618, when Nwork decreases during the adjustment, Step S610 is performed.

A computer program product is provided according to another embodiment of the present disclosure. For example, the computer program product includes multiple code snippets, and may be implemented as an application program or may be stored in a system program. When the computer program product is loaded into an electronic apparatus comprising a buffer memory, the electronic apparatus executes multiple program commands, which are for executing the above methods in the foregoing embodiments. Further, the computer program product may be regarded as a computer-readable information storage medium storing at least one program or software module. The program or software module may be regarded as a presentation of the computer program product, and is for executing the above methods in the foregoing embodiments. For example, the computer program product may be a storage medium such as an optical information storage medium, a magnetic information storage medium or firmware, or may be a code transmitted via a network/transmission medium (e.g., air).

Therefore, it is illustrated with the foregoing embodiments that the congestion control method for a femtocell offers the advantages below.

First of all, it is effectively determined whether the femtocell is congested according to the number of user equipments, transmission power and code resource utilization conditions.

Secondly, not only the service stability of the femtocell is optimized to reduce the congestion, but also the loading of the femtocell is lowered by filtering access attempts of user equipments. Further, the femtocell is prevented from congestion incurred by excessive concurrent reconnections of user equipments, so that the femtocell is allowed to efficiently recover from the congestion to reduce the congestion rate.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A congestion control method for a femtocell, comprising:
   prompting the femtocell to enter an access permitted mode when the femtocell is not congested;
   sending a system information modification notification from the femtocell when the femtocell enters the access permitted mode; and
   repeatedly adjusting at least one cell selection parameter or at least one cell reselection parameter by the femtocell, to gradually increase a coverage of the femtocell, when the femtocell enters the access permitted mode;
   wherein the step of repeatedly adjusting the at least one cell selection parameter or the at least one cell reselection parameter by the femtocell to gradually increase the coverage of the femtocell comprises:
   when the femtocell determines a first data is greater than a difference between a second data and a third data, iteratively adjusting each cell selection parameter or each cell reselection parameter to a target value by the femtocell;
   wherein, the first data represents a number of non-working user equipments, the second data represents a number of working user equipments, and the third data represents a maximum number of working equipments allowed by the femtocell.

2. The method according to claim 1, further comprising:
   when the femtocell determines that the first data is not greater than the difference between the second data and the third data, directly adjusting each cell selection parameter or each cell reselection parameter to the target value by the femtocell.

3. The method according to claim 1, wherein the step of iteratively adjusting each cell selection parameter or each cell reselection parameter to the target value comprises:
   adjusting one cell selection parameter or one cell reselection parameter to approximate the target value;
   determining whether the cell selection parameter or the cell reselection parameter reaches the target value;
   activating a timer when it is determined that the cell selection parameter or the cell reselection parameter does not reach the target value; and
   iterating the step of adjusting the cell selection parameter or the cell reselection parameter to make the adjusted cell selection parameter or the adjusted cell reselection parameter to approximate the target value when the timer is timeout.

4. The method according to claim 1, further comprising:
   determining the first data according to a difference between the second data and a fourth data by the femtocell;
   wherein, the fourth data represents a number of user equipments previous connected or currently connected to the femtocell within a period before the femtocell enters an access barred mode.

5. The method according to claim 1, wherein the step of adjusting the at least one cell selection parameter or the at least one cell reselection parameter by the femtocell to gradually increase the coverage of the femtocell comprises at least one of:
increasing a downlink common channel power parameter;
decreasing a cell selection minimum quality parameter;
decreasing a detected cell signal level reception parameter;
decreasing a hysteresis parameter; and
decreasing a reselection time parameter.

6. The method according to claim 1, further comprising:
prompting the femtocell to enter an access barred mode when the femtocell is congested;
adjusting the at least one cell selection parameter or the at least one cell reselection parameter by the femtocell to gradually reduce the coverage of the femtocell, when the femtocell enters the access barred mode; and
sending a system information modification notification from the femtocell when the femtocell enters the access barred mode.

7. The method according to claim 6, wherein the step of adjusting the at least one cell selection parameter or the at least one cell reselection parameter by the femtocell to gradually reduce the coverage of the femtocell comprises:
when the femtocell determines that a first data is greater than a difference between a second data and a third data, adjusting each cell selection parameter or each cell reselection parameter to a predetermined value by the femtocell such that the femtocell is unlikely to be selected;
wherein, the first data represents a number of non-working user equipments, the second data represents a number of working user equipments, and the third data represents a maximum number of working equipments allowed by the femtocell.

8. The method according to claim 6, wherein the femtocell selectively sends the system information modification notification to at least one user equipment.

9. The method according to claim 8, wherein the femtocell refuses to send the system information modification notification to a user equipment when the user equipment accessing the femtocell is working.

10. The method according to claim 6, further comprising:
prioritizing the femtocell to enter the access permitted mode when the femtocell is in an isolated island environment.

11. The method according to claim 1, further comprising:
determining whether the femtocell is congested according to a number of user equipments accessing the femtocell, transmission power of the femtocell, and/or code resources of the femtocell.

12. The method according to claim 11, wherein the step of determining whether the femtocell is congested comprises:
activating a timer when it is determined that a current transmission power of the femtocell is greater than a difference between a maximum transmission power and a reserved value; and
determining the femtocell as congested when the timer is timeout and the current transmission power is again determined as being greater than the difference between the maximum transmission power and the reserved value.

* * * * *